May 18, 1926.
W. COX ET AL
PROCESS OF MAKING CORRUGATED WIRE GLASS
Filed August 7, 1920    2 Sheets-Sheet 1
1,585,607
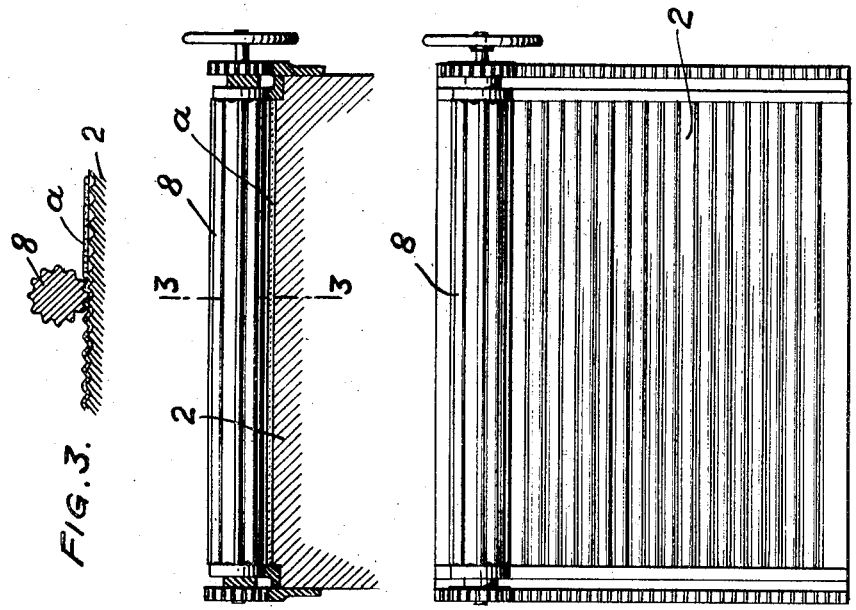
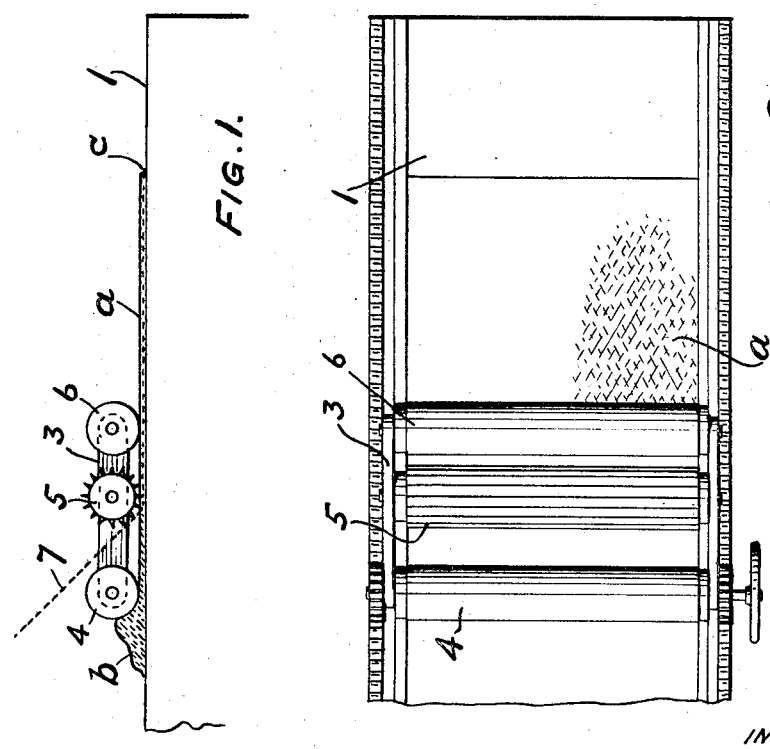
WITNESS:
INVENTORS
Walter Cox
Arno Shuman
BY
ATTORNEY.

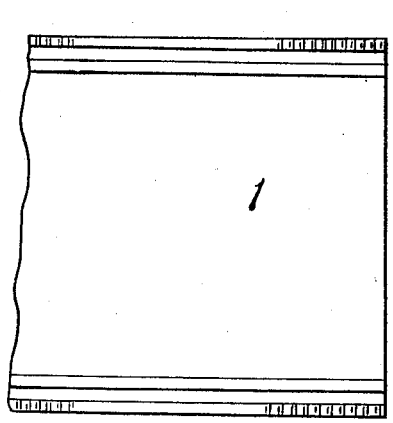
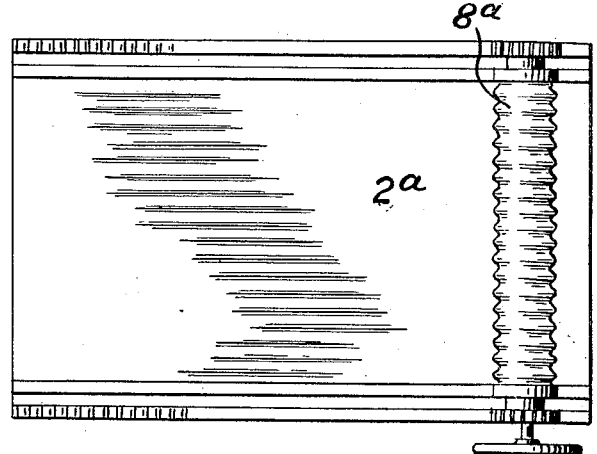
FIG. 4.
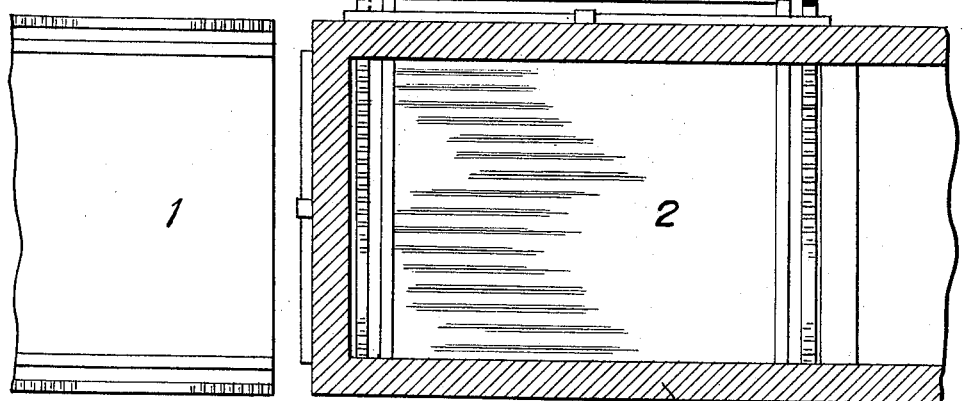
FIG. 5.
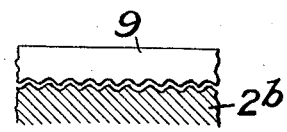
FIG. 6.
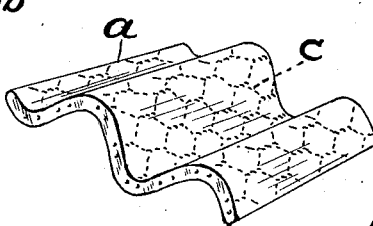
FIG. 7.

Patented May 18, 1926.

1,585,607

UNITED STATES PATENT OFFICE.

WALTER COX AND ARNO SHUMAN, OF PHILADELPHIA, PENNSYLVANIA, ASSIGNORS TO PENNSYLVANIA WIRE GLASS COMPANY, OF PHILADELPHIA, PENNSYLVANIA, A CORPORATION OF NEW JERSEY.

PROCESS OF MAKING CORRUGATED WIRE GLASS.

Application filed August 7, 1920. Serial No. 401,925.

The principal object of the present invention is to provide an expeditious, simple and comparatively inexpensive process of making sheets of corrugated wire glass of relatively large size and good quality.

According to the present invention flat sheets of wire glass are rolled according to known methods and these sheets of wire glass while retaining their initial heat, and with or without the application of additional heat, are corrugated by appropriate rolling with corrugated rolls or by pressure with corrugated dies.

The accompanying drawings are illustrative of the invention and in them—

Figures 1 and 2 are respectively a sectional elevation and a top or plan view diagrammatically illustrative of apparatus useful in the practice of the invention.

Fig. 3, is a section on the line 3—3 of Figure 1.

Fig. 4, is a top or plan view illustrative of a modified apparatus.

Fig. 5, is a top or plan view, partly in section, illustrating another modification.

Fig. 6, is a transverse sectional view illustrating still another modification, and Fig. 7, is a perspective view of a very small piece of the product.

In the drawings, Figs. 1 to 3, a sheet of flat wire glass $a$, is rolled on the flat table 1, arranged adjacent to the lengthwise corrugated table 2, and this can be done in any well known way, for example, by means of a carriage 3, equipped with rollers 4, 5 and 6, and with a wire guide or chute 7, and adapted in passing towards the left, to roll the pour $b$, of glass into the flat sheet $a$, and to embed the wire $c$, in it. While this flat sheet of wire glass $a$, retains the initial heat of the pour and is sufficiently plastic, it is promptly transferred to the corrugated table 2, and corrugated, for example, by the passage of the corrugated roller 8, across the table 2, from side to side. As shown in Fig. 4, the operation is the same, except that the table $2^a$, is corrugated lengthwise and the corrugated roller $8^a$, is passed across the table $2^a$, from end to end. As shown in Fig. 6, the corrugated roller is replaced by a corrugated presser plate or platen 9, which operates upon the face of the flat sheet $a$, of wire glass, while plastic from its initial heat, to corrugate it upon the corrugated table $2^b$.

In Fig. 5, the corrugated table 2, is arranged in an oven 10, to the interior of which the corrugated roll $8^b$, is afforded access and which may be a part of or arranged at the entrance of the lear, and in this case heat is imparted to the sheet of flat wire glass in addition to the heat which it retains from the original pour.

By corrugating the flat sheet of wire glass before it parts with all of its original heat and while it is plastic and even if it has been somewhat additionally heated, the wire mesh will not come to or through the surfaces of the finished corrugated sheet, but will remain embedded and occupy a generally central position. This result is remarkable and may be explained by stating that in our process the surfaces of the flat sheet of wire glass chill before the interior portion in which wire is arranged so that the wire and glass can be brought to corrugated form by the occurrence of the necessary relative movement or stretching of the wire, but without undue displacement or surface exposure of the latter. While in Fig. 5, the re-heating and corrugating are both done in an oven, nevertheless the corrugating can be done outside of the oven and promptly after additional heat has been imparted to the sheet of wire glass therein.

We realize that modifications can be made in details and that that fact will be obvious to those skilled in the art, hence we do not limit our invention to such matters, or otherwise than as the prior art and the appended claim may require.

We claim:

The process of making corrugated wire glass which consists in rolling a flat sheet of glass with flat wire mesh embedded therein, and while the interior portion of said sheet is sufficiently plastic by heat to permit the twists of the mesh to stretch and while the exterior of the sheet is sufficiently solid by cooling upon bending to retain its form, corrugating said sheet and mesh at one operation.

WALTER COX.
ARNO SHUMAN.